United States Patent
Caves et al.

(10) Patent No.: US 6,665,300 B1
(45) Date of Patent: Dec. 16, 2003

(54) COLLISION AVOIDANCE IN A TELECOMMUNICATIONS NETWORK

(75) Inventors: Keith Caves, Sawbridgeworth (GB); Simon Daniel Brueckheimer, London (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/320,883

(22) Filed: May 27, 1999

(30) Foreign Application Priority Data

Dec. 21, 1998 (GB) .............................. 9828222

(51) Int. Cl.[7] .............................................. H04L 12/56
(52) U.S. Cl. ................. 370/395.2; 370/230; 370/395.3; 370/395.64; 709/209; 709/225; 709/240
(58) Field of Search ....................... 370/395.64, 395.4, 370/395.31, 395.3, 230, 410, 395.6, 431, 462, 455, 282; 709/225, 209, 240

(56) References Cited

U.S. PATENT DOCUMENTS

| | | | | |
|---|---|---|---|---|
| 5,953,339 A | * | 9/1999 | Baldwin et al. ............. 370/397 |
| 6,075,798 A | * | 6/2000 | Lyons et al. ................. 370/474 |
| 6,128,659 A | * | 10/2000 | Subblah et al. ............. 709/225 |
| 6,169,738 B1 | * | 1/2001 | Sriram et al. .......... 370/395.21 |
| 6,233,223 B1 | * | 5/2001 | Sabry et al. ................ 370/230 |
| 6,504,845 B1 | * | 1/2003 | Petersen et al. ............ 370/412 |

* cited by examiner

*Primary Examiner*—Dang Ton
*Assistant Examiner*—Tri H. Phan
(74) *Attorney, Agent, or Firm*—Barnes & Thornburg

(57) ABSTRACT

Collisions caused by simultaneous allocation of the same channel identifier (CID) to two AAL2 connections over an ATM virtual channel connection between first and second nodes in an asynchronous network are avoided by the use of status records. Each node maintains a record of currently assigned CIDs and compares the CIDs of incoming connection requests with that record. Where the CID of such an incoming request is found to have been assigned, a message is returned to the request originator refusing the connection request. Preferably a set of CIDs is assigned to one node so that, in the event of a potential collision, that node seizes the connection.

5 Claims, 4 Drawing Sheets

COLLISION AVOIDANCE IN A
TELECOMMUNICATIONS NETWORK

This invention relates to a system and method for the transport of voice or data traffic over a telecommunications network, and in particular to collision avoidance in such a network.

BACKGROUND OF THE INVENTION

A recent innovation in telecommunications technology has been the introduction of the asynchronous transfer mode (ATM) transmission protocol. In this technique, information to be transmitted is loaded into packets or cells each of which is provided with a header containing information that is used for routing the cell to its correct destination. The header of the packet or ATM cell may also contain other protocol control information relating to the cell payload and, in particular may include a cell sequence number. The sequence number can be used to indicate missing cells, or cells that have been unacceptably delayed.

Before a cell stream representing a connection is transmitted between end points in an ATM network, it is necessary to set up a virtual channel connection (VCC) that will carry the traffic. For switched virtual connections (SVCs), this is effected by an ATM signaling procedure, whereas for permanent virtual connections (PVCs) it is effected by a management procedure. Once an ATM connection is available, it may be used by any of the standard ATM adaptation layers, including AAL2, to carry traffic. AAL2 enables multiple calls to be transported on a single ATM VCC via a multiplexing technique that places short packets of information (voice or data) within an ATM cell. Individual AAL2 calls on the same VCC are distinguished by their Channel Identifier (CID) values, carried within the headers of the short information packets. Up to 248 CID values are available for use on a VCC. It will be appreciated that, in order to prevent collision between calls or connections, the same CID should not be allocated on the same VCC to more than one connection at any one time. However, it is possible for two end points or nodes to independently allocate the same CID simultaneously thus leading to a collision situation. This of course can reduce the quality of service that can be provided by the network.

There are various techniques available for reducing the risk of collision, but these tend to fail under high traffic load conditions. This can lead to increased queuing and, under extreme conditions, to an effective breakdown of the network.

SUMMARY OF THE INVENTION

An object of the invention is to minimise or to overcome the above disadvantage.

A further object of the invention is to provide an improved arrangement and method for preventing and/or resolving connection collision in an asynchronous network.

A further object of the invention is to provide an improved network node construction.

According to a first aspect of the invention, there is provided method of setting up a connection over an ATM virtual channel connection (VCC) between first and second nodes in an asynchronous network in which said connections are identified by respective connection identifier (CID) values, the method comprising assigning a said CID value to each connection request, and, in the event of simultaneous assignment of the same CID value by both said nodes, awarding that connection to a predetermined one of said nodes.

According to another aspect of the invention, there is provided a method of setting up a connection over an ATM virtual channel connection (VCC) between first and second nodes in an asynchronous network in which said AAL2 connections are identified by respective connection identifier (CID) values, the method comprising;
  at the first node, assigning a CID value to a connection request, storing the assigned CID value in a first status record associated with the first node, and signalling that connection request and assigned CID value over a signalling channel to the second node;
  at the second node, receiving the connection request and CID value, comparing the CID value with a stored set of assigned CID values in a second status record associated with the second node, where the CID value is not assigned in the second status record, signalling to the first node a message accepting the connection request, and, where the CID value is assigned in the second status record, signalling to the first node a message refusing the connection request According to a further aspect of the invention, there is provided an asynchronous network node arranged for setting up connections over an ATM virtual channel connection (VCC) between that node and a similar further node in an asynchronous network in which the connections are identified by respective connection identifier (CID) values, the network node comprising; means for assigning a first CID value to a first connection request, storage means comprising status record for storing that assigned CID value together with other CID values assigned by the assigning means, means for signalling that connection request and CID value over a signalling channel to the further node; means for receiving from the further node a further connection request and an associated further CID value, means for comparing the further CID value with the stored assigned CID values, and means for signalling to the further node, where the CID value is not marked as being assigned in the status store, a first message accepting the connection request or, where the CID value is marked as being assigned in the status store, a second message refusing the connection request.

According to another aspect of the invention, there is provided a method of setting up connections over an ATM virtual channel connection (VCC) between first and second nodes in an asynchronous network in which said connections are identified by respective connection identifier (CID) values, the method comprising allocating sets of said CID values to one of said nodes which node becomes the owner of those CID values, transmitting connection requests at each said node and attaching a respective CID value to each said request, and, in the event of a potential collision arising from the simultaneous allocation of the same CID value by both nodes, accepting the connection request from said one node owning the CID value and refusing the connection request from the other node.

According to a further aspect of the invention, there is provided an arrangement for setting up connections in response to connection requests over ATM virtual channel connection (VCC) between first and second nodes in an asynchronous network in which connections are identified by respective connection identifier (CID) values, the arrangement comprising; at each said node,
  means for assigning a CID value to a said connection request, means for storing the assigned CID value in a status record, means for signalling that connection request and assigned CID value over a signalling channel to the other said node; means for receiving a further connection request and CID value from the other said node, means for comparing the further CID value with the stored assigned CID values in the status record, and means for signalling to the said other node a first message accepting the connection request where the further CID value is not marked as being assigned in the status record or, where the further CID value is marked as being assigned in the status record, signalling to the further node a second message refusing the connection request.

As each node checks the CID of each received connection request against its own status record of assigned requests, a connection can be refused where potential duplicate allocation of the same CID is discovered. Thus, connections are refused before potential collisions can occur.

Typically, the connections are ATM Adaptation Layer Two (AAL2) connections.

In a preferred embodiment, CID values are assigned to one node so that, in the event of a potential collision, resolution is effected by seizure of the connection by that one node.

BRIEF DESCRIPTION OF THE DRAWINGS

An embodiment of the invention will now be described with reference to the accompanying drawings in which.

DESCRIPTION OF PREFERRED EMBODIMENT

Figure 1:
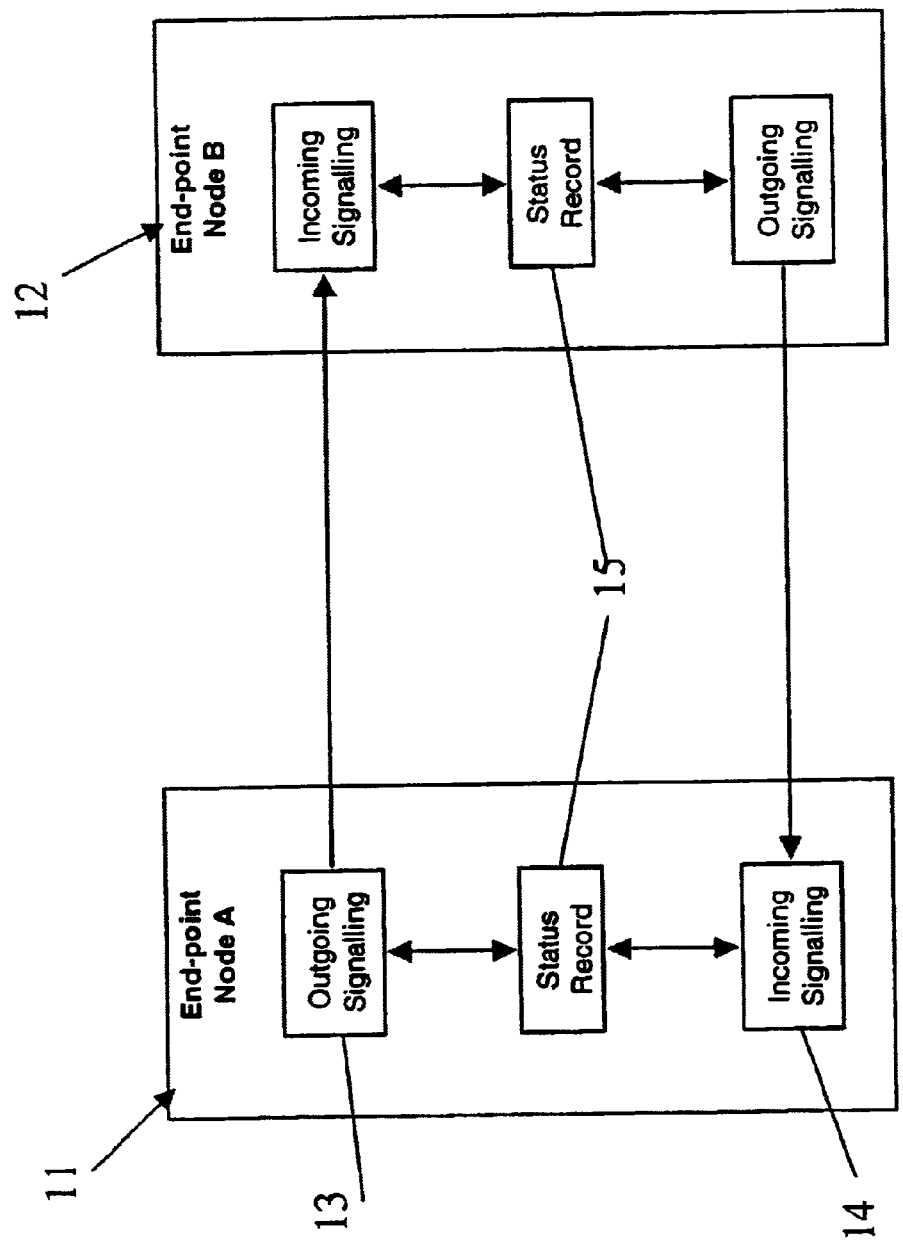
FIG. 1 shows in schematic form an AAL2 signalling function architecture according to a preferred embodiment of the invention.

Referring first to FIG. 1, this illustrates the AAL2 signalling function architecture employed to set up an AAL2 connection between two end points or nodes 11 and 12. As shown in FIG. 1, each node incorporates an outgoing signalling function 13, an incoming signalling function 14 and a status record 15. Channel identifiers (CIDS) are entered in the status record when the corresponding AAL2 connections are set up and are removed from the status record when those connections are subsequently released so that they then become available for further connections. Preferably, the signalling functions 13 and 14 are AAL2 signalling functions. AAL2 connections are set up between the nodes on demand by signalling between the respective signalling functions. For clarity, only those parts of the nodes essential to the understanding of the invention are depicted in FIG. 1. It will further be understood that FIG. 1 is a functional diagram.

The AAL2 signalling function is divided into 3 sets of procedures comprising outgoing signalling procedures, incoming signalling procedures and AAL2 channel status record procedures.

The outgoing signalling procedures are invoked when the local call handling entity originates either AAL2 connection set-up or AAL2connection release instructions.

The incoming signalling procedures are similarly invoked when the distant peer call handling entity originates either AAL2 connection set-up or AAL2 connection release instructions.

The status record procedures are invoked during AAL2 connection set-up and release to provide a record of the status of the individual AAL2 channels (CID values) available for assignment on AAL2VCCs.

The outgoing and incoming procedures are applied to AAL2 channels during the set-up and release phases of each AAL2 connection. They are responsible for controlling the status of AAL2 channels by means of signals exchanged with the Status Record procedures. The status record procedures are responsible for maintaining the status of a given set of AAL2 channels that have been allocated for use on one or more AAL2 VCCs.

The status record procedures are concerned with both static and dynamic control of the AAL2 resources (i.e. CID values). Static control is exercised under instructions from layer management. This includes the following:

Initialisation of the number of allocated AAL2 channels (CID values)

Initialisation of the number of pre-assigned AAL2 channels

Subsequent updating of the allocated and pre-assigned CID values

Indication that this node does/does not 'own' the CID values allocated

Enquiries on the status of AAL2 channels.

Whilst static control of the status record function as described above is controlled by layer management, dynamic control concerned with the instantaneous status of the individual AAL2 channels to reflect the cycle of connection set-up and release, is controlled by the outgoing and incoming signalling procedures. Dynamic control maintains the following records:

CID values that are allocated but currently unassigned to AAL2connections

CID values currently assigned to AAL2 connections

Pre-assigned CID values that are currently activated

Pre-assigned CID values that are currently deactivated.

Pre-assigned CID values are equivalent to 'nailed up' AAL2connections. These may be 'activated' when required to carry data between the two end-points permanently associated with the connection and 'deactivated' when not required.

The AAL2 signalling procedures are responsible for a number of concerns, including the following:

Individual AAL2 channel (CID value) selection based on a CID selection policy.

CID collision resolution policy.

Determination of the appropriate messages for transmission based on knowledge of the allowed end-end messaging sequences.

Maintenance of the records containing the status of individual CID values.

The functional architecture defined above assumes that the status record procedures deal with a single request at a time, i.e. conceptually, requests for assignment or release of AAL2 channels are queued for processing in serial fashion. This reduces complexity in operation and in particular, leads to a simple collision resolution mechanism. Since the amount of processing required in the status record to deal with requests for assignment and release of CIDs is small, these operations can take place very quickly with reasonable implementations so that serial operation at the interface should not lead to bottlenecks.

Collision can occur when the outgoing signalling procedures at the peer AAL2 end-point nodes both assign the same CID value substantially simultaneously to different AAL2 connections. In order to ameliorate this situation, we employ two types of collision policy:

1) Collision avoidance—This is an operational policy that minimises the opportunities for collision to occur. Our preferred technique is to require one of the AAL2 end-point nodes to select the lowest CID value currently available and the other to select the highest value. Other examples are possible.

2) Collision resolution—In spite of any collision avoidance policy, there will still be occasions during which collisions can occur, for example under high load conditions when all CID values except one have been assigned to connections. In these cases, a policy for collision resolution, i.e. a policy for deciding automatically which node will win a disputed connection request, is desirable. In a preferred embodiment, ownership of all CID values within a given VCC is allocated to one end-point node. When collision occurs, the node 'owning' the contested CID value then wins and its connection succeeds with the losing node backing off.

A major advantage of the AAL2 signalling architecture proposed above is its simple and efficient resolution of collision situations. Such a situation is illustrated in FIG. 2.

Figure 2:
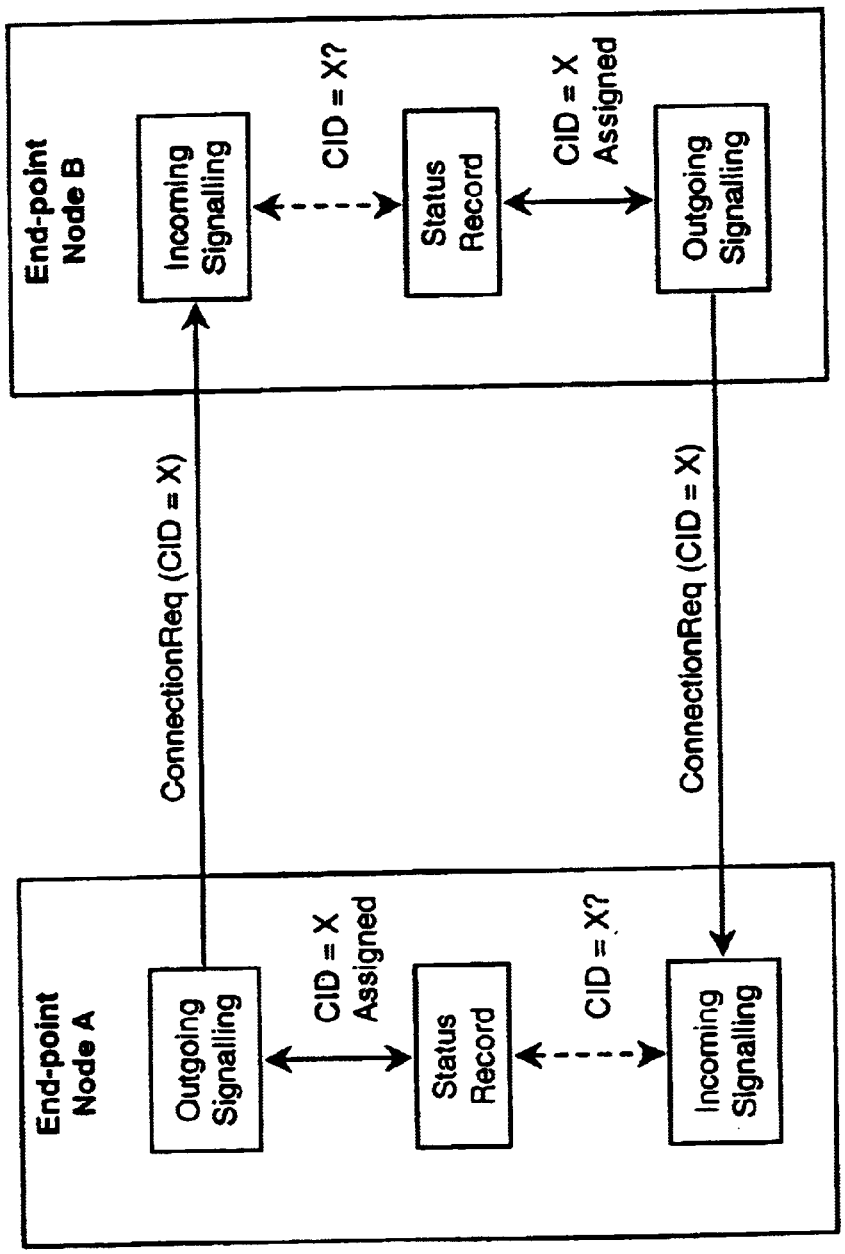
FIG. 2 illustrates in schematic form the operating sequence of the signalling function architecture of FIG. 1.

FIG. 2 illustrates the situation in which the two outgoing signalling procedures at the respective two AAL2 end-point nodes have substantially simultaneously been assigned the identical CID value (=X) for use on their respective connections. The outgoing signalling procedures at node A cause a ConnectionReq message to be sent to the peer incoming signalling procedures at node B requesting the use of CID value=X for an AAL2 connection. Simultaneously, the outgoing signalling procedures at node B cause a ConnectionReq message to be sent to the peer incoming signalling procedures at node A requesting the use of CID value=X for an AAL2 connection. This results in the two incoming signalling procedures requesting from their respective status record the assignment of CID value=X for their different connections. The two status records thus each has CID=X assigned for outgoing connection attempts, when each receives a request to assign CID=X to incoming connection attempts. This condition defines the CID assignment collision situation.

Figure 3:
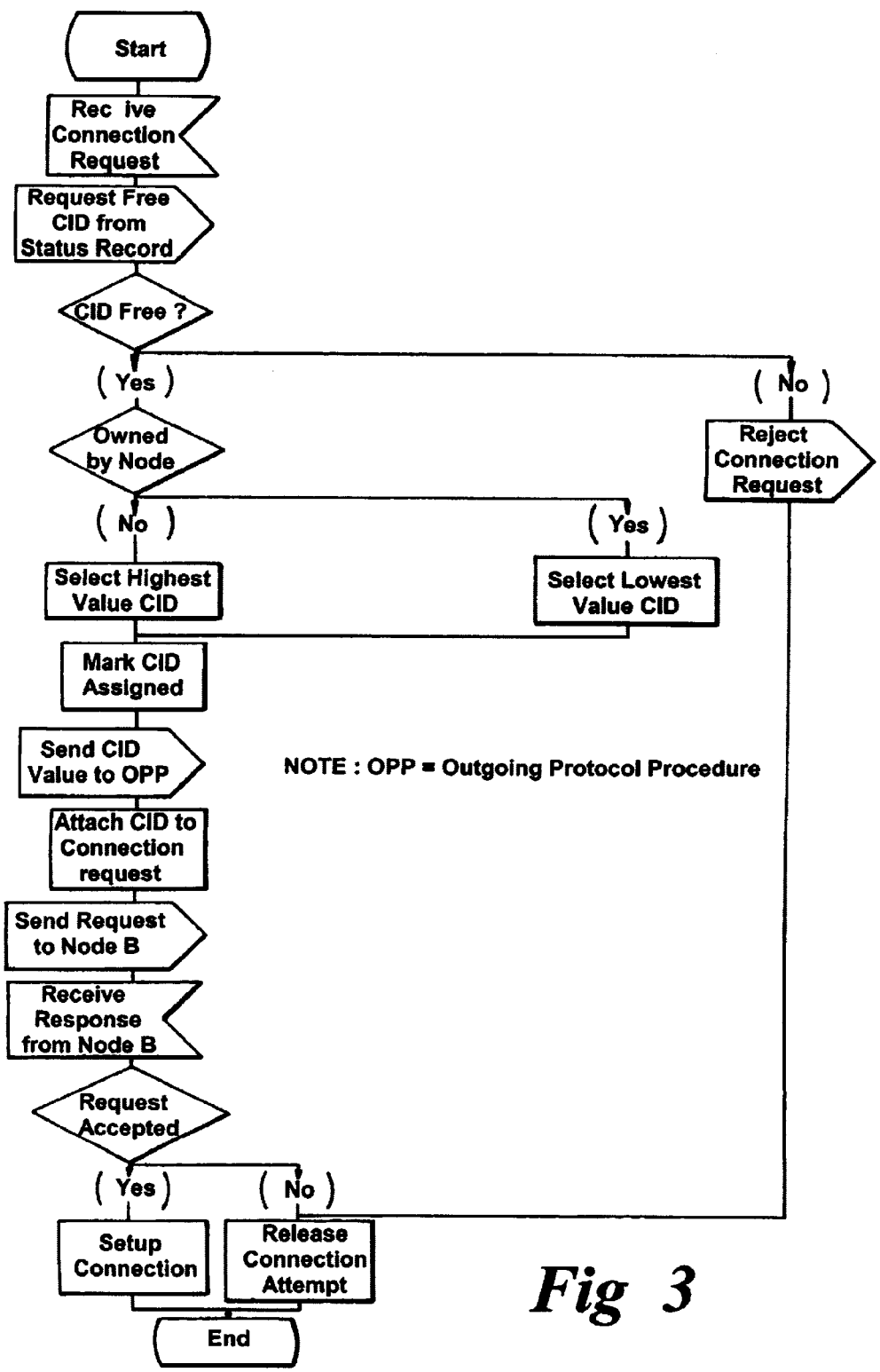
FIGS. 3 and 4 are flow charts representing the CID assignment and collision avoidance process employed in the architecture of FIG. 1.
Figure 4:
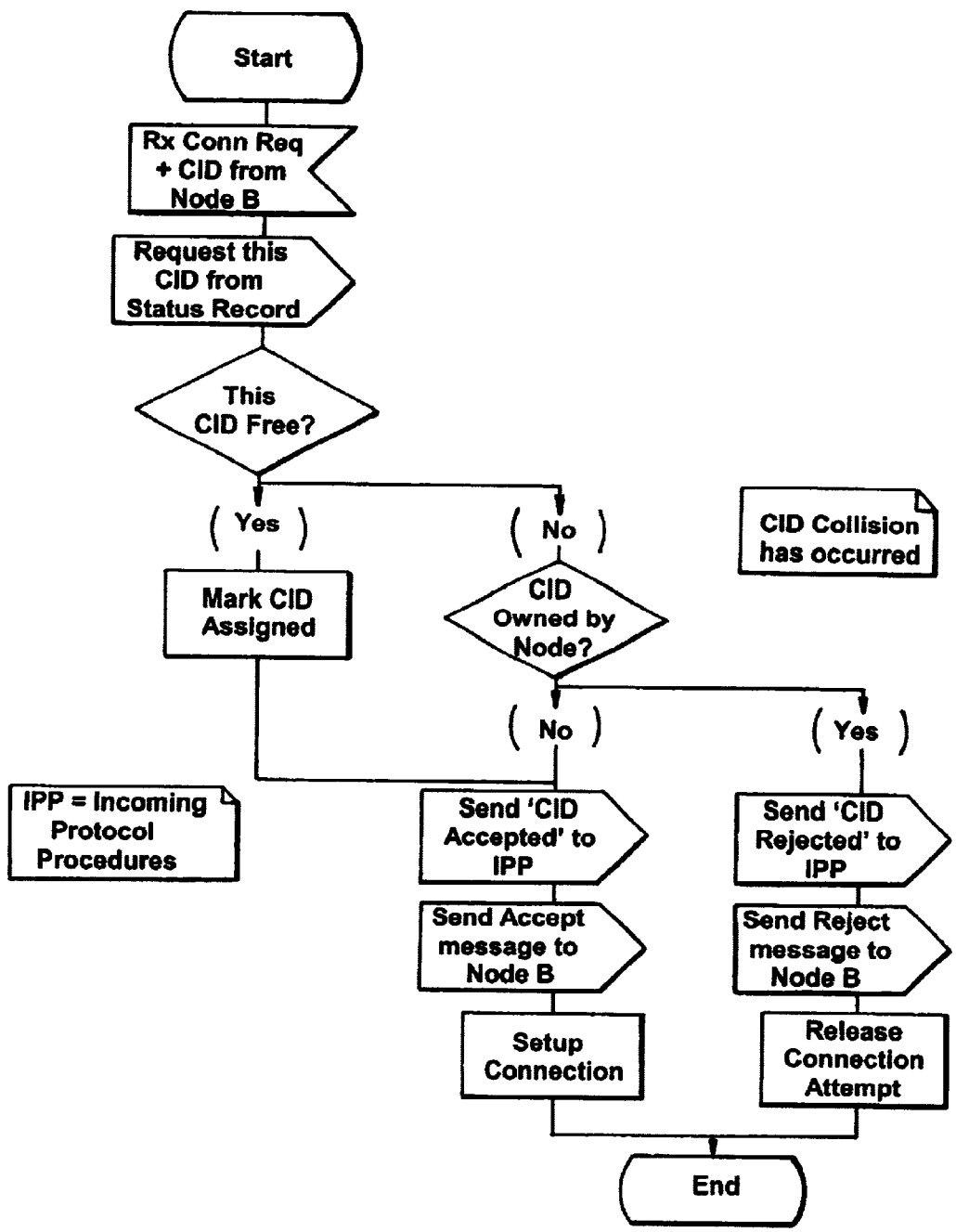

Flow charts illustrating the operation of the CID assignment and CID collision resolution mechanisms at a node for outgoing and incoming connection requests are shown by way of example in FIGS. 3 and 4 respectively.

So long as a collision resolution policy is in force, in which each of the Nodes A and B know which Node owns a disputed CID value, the collision situation is simply resolved with the above architectural model. Assuming for example that node B 'owns' CID=X, the resolution procedures are as follows:

1] The status record at node B rejects the incoming signalling procedures' request for the assignment of CID=X for node A's connection, while leaving the assignment of CID=X associated with node B's outgoing signalling procedures intact.

2] The incoming signalling procedures at node B then return a ReleaseAck message to the outgoing signalling procedures at node A containing the reason for rejecting the connection (no resources).

3] The status record at node A accepts the Incoming Signalling procedures' request for the assignment of CID=X for Node B's connection.

4] The incoming signalling procedures at node A then return a ConnectAck message to the outgoing signalling procedures at node B to complete connection set-up in favour of node B.

5] Meanwhile, at node A, the ReleaseAck message from Node B (see 2] above) causes-the outgoing signalling procedures to release the connection attempt, which includes requesting the status record to relinquish any claim on CID=X insofar as the outgoing procedures are concerned. Thus, node A backs-off to allow node B to use CID value=X, as required by the collision resolution policy.

From the foregoing, it can be seen that responsibility for collision resolution lies with the status record procedures in the two AAL2connection end-point nodes. The resolution mechanism is simple, depending on a single decision concerning which node 'owns' the disputed . CID value, and does not require any additional signalling messages between the two nodes. Where a node receives a refusal of a connection request or attempt so as to avoid a potential collision, that node can then allocate a new CID value and then repeat the request procedure.

It will of course be appreciated that although the collision avoidance technique has been described above with particular reference to ATM Adaptation Layer Two (AAL2), it is by no means limited to use with this particular protocol.

It will be understood that the above description of a preferred embodiment is given by way of example only and that various modifications may be made by those skilled in the art without departing from the spirit and scope of the invention.

We claim:

1. A method of setting up a connection over an ATM virtual channel connection (VCC) between first and second nodes in an asynchronous network in which said connection is identified by respective connection identifier (CID) values, the method comprising;

at the first node, assigning a CID value to a connection request, storing the assigned CID value In a first status record associated with the first node, and signalling that connection request and assigned CID value over a signalling channel to the second node; and at the second node, receiving the connection request and CID value, comparing the CID value with a stored set of assigned CID values in a second status record associated with the second node, where the CID value is not assigned in the second status record, signalling to the first node a message accepting the connection request, and, where the CID value is assigned in the second status record, signalling to the first node a message refusing the connection request;

wherein ownership of each CID value within said VCC is allocated to one or other of said first and second nodes, and wherein a connection request incorporating a CID value is granted to that one of the first and second nodes which owns that CID value in the event of a simultaneous connection request incorporating the same CID value from the other one of said first and second nodes, and wherein said first and second nodes allocate CID values from opposite ends of a range of said CID values.

2. A method as claimed in claim 1, wherein ownership of all CID values within said virtual channel connection (VCC) is assigned to one of said first and second nodes.

3. A method as claimed in claim 2, wherein said connection is an ATM Adaptation Layer Two (AAL2) connection.

4. A method of setting up a connection over an ATM virtual channel connection (VCC) between first and second nodes in an asynchronous network in which said connection is identified by respective connection identifier (CID) values, the method comprising allocating sets of said CID values to one or other of said nodes, transmitting connection requests at each said node and attaching a respective CID value to each said request, and, in the event of a potential collision arising from the simultaneous allocation of the same CID value by both nodes, accepting the connection request from the node to which that CID value is allocated and refusing the connection request from the other node.

5. An arrangement for setting up a connection over an ATM virtual channel connection (VCC) between first and second nodes in an asynchronous network in which said connection is identified by respective connection identifier (CID) values, the arrangement comprising means for allocating sets of said CID values to one or other of said nodes by allocating to said first and second nodes respectively CID values from opposite ends of a range of said CID values, means for transmitting connection requests at each said node and attaching a respective CID value to each said request, and, collision resolution means arranged so that, in the event of a potential collision arising from the simultaneous allocation of the same CID value by both nodes, the connection request from the node to which that CID value is allocated is accepted and the connection request from the other node is refused.

* * * * *